United States Patent [19]

Stone et al.

[11] 3,967,968
[45] July 6, 1976

[54] BAND PLY DOPE COMPOSITIONS

[75] Inventors: Christopher Robin Stone, Fulham; Brian Matthew Eugene McGarry, Kingston-on-Thames, both of England

[73] Assignee: The Firestone Tire & Rubber Company, Akron, Ohio

[22] Filed: Nov. 29, 1974

[21] Appl. No.: 528,000

Related U.S. Application Data

[63] Continuation of Ser. No. 365,650, May 31, 1973, abandoned, Continuation-in-part of Ser. No. 236,531, March 10, 1972, abandoned.

[52] U.S. Cl. .............................. 106/38.28; 106/189; 106/193 J; 106/197 R; 252/27; 252/28; 252/29; 252/49.5
[51] Int. Cl.² ...................... B28B 7/36; B28B 7/38; C08L 1/28; C09J 3/04
[58] Field of Search ............... 106/189, 193 J, 197, 106/38.27, 38.28, 38.22, 38.23; 252/27, 28, 29, 49.5; 264/315, 338

[56] References Cited
UNITED STATES PATENTS

| | | | |
|---|---|---|---|
| 1,462,563 | 7/1923 | Voltz | 252/49.5 |
| 2,201,271 | 5/1940 | Partridge | 264/338 |
| 3,314,809 | 4/1967 | Klug | 106/189 |
| 3,485,915 | 12/1969 | Gerstein et al. | 106/189 |
| 3,532,624 | 10/1970 | Cekada | 252/28 |
| 3,713,851 | 1/1973 | Cekada | 252/28 X |

*Primary Examiner*—Joan E. Welcome

[57] ABSTRACT

This disclosure relates to an improved band ply lubricant to be utilized in tire curing operations. The composition of this band ply dope or lubricant comprises a liquid phase, a thickening agent, a fine solid material, and a high viscosity lubricant. These materials are present in precise ratios so that the band ply dope composition exhibits a thixotropic character.

2 Claims, No Drawings

BAND PLY DOPE COMPOSITIONS

This is a continuation of application Ser. No. 365,650, filed May 31, 1973, which was a continuation-in-part of Ser. No. 236,531, filed Mar. 10, 1972, respectively now abandoned.

BACKGROUND OF THE INVENTION

The present invention relates to a dope composition for application to the band ply or inner liner of a "green" vehicle tire before molding and to a process for the production of such dope composition.

In the production of vehicle tires it is conventional practice to mold the green tire in a molding press in which the tire is pressed outwardly against an outer mold, which defines the tread pattern and the shape of the side walls, by means of a bladder which is sequentially pressurized with low pressure steam, followed by high pressure steam or hot water, followed by cold water and then evacuated by draining the cold water and applying vacuum service. Other methods can be used to collapse the bladder.

One of the principal functions of the dope is to act as a lubricant between the tire inner liner and the press bladder both during the loading stage and the stripping stage of the molding operation; particularly during inflation of the bladder in the loading stage, there is a substantial relative movement between the contacting surfaces of the bladder and the tire inner liner. Unless adequate lubrication is provided between tire and liner there is a tendency for the bladder to buckle, which may result in mis-shaping of the tire and consequent rejection of the tire. At the final stage during bladder collapse and the stripping of the tire from the bladder, there is again considerable relative movement between the contacting surfaces of the bladder and the now cured, tire inner liner. Unless adequate lubrication is provided between bladder and liner excessive wear and roughening of the bladder will occur, resulting in reduced bladder life.

Another of the principal functions of the dope is to avoid entrapment of major air bubbles between the tire inner liner and the bladder at the beginning of the pressing operation and to promote entry of air between the bladder and the tire inner liner at the end of the molding operation to avoid adhesion of the tire inner liner to the bladder when the bladder is evacuated prior to withdrawal from within the tire. The entrapment of air between the bladder and the inner liner and failure of the liner to separate from the bladder on evacuation of the bladder at the end of the molding cycle may both lead to such severe defects in the molded tire as to require it to be rejected.

It has been the practice therefore to employ a band ply dope which incorporates a lubricant, dispersed or dissolved in a liquid medium, and fine solid particles, such as mica or graphite, in suspension in the liquid medium. While other solid particles may be employed, mica and graphite are preferred because of their laminar nature. It is conventional to employ these materials in finely divided form, but having a substantial proportion of particles of substantial size. For example, mica for this purpose is generally required to pass 100% through a 100 BSS mesh sieve (to be smaller than 150 microns) and to have a substantial proportion, say 20%, retained on a 325 BSS mesh sieve (to be larger than 44 microns).

It has heretofore been the general practice to apply a band ply dope by means of a brush to some types of tire. Since this is a very monotonous job, the applied dope coating is rarely uniform and it is quite possible for some areas to be omitted. Where there are areas of the inner liner which are uncoated with dope, particularly in the region of the beads, defects due to adhesion to the bladder can be very severe.

Troubles due to misapplication of the dope may be overcome by spraying the dope since this can lead to much more uniform and complete coatings. In fact, known alcohol-based and petroleum-based dopes have been applied by spraying, but all known alcohol-based and the majority of the petroleum-based dopes produced soft dope films, which are unsuitable for use with certain classes of tire, such as radial-cord tires. With such tires the contact movement between the bladder of the press and the inner liner of the green tire at the beginning of the molding cycle is sufficient to rub off a soft dope film, particularly in the bead region, where it is important to have an effective dope film.

The known alcohol-based and petroleum-based dopes, although they dry very rapidly, are very mobile and suffer from the disadvantage that they run after being sprayed and form local pools of dope, which, on drying, leave thick areas of dry dope which may flake off, leading to other difficulties. Furthermore, they suffer from the disadvantage that the suspended mica or like solid particles tend to separate from the liquid medium under the shear conditions existing at the spray nozzle, which lead to nozzle blockage and to improperly doped areas, which have been wetted with the liquid medium, but carry no applied solid. Dopes, which dry to a hard, tough film on the inner liner of the green tire, are known, but these have not been suitable for application by spraying.

It is an object of the present invention to provide a composition suitable for use as a band ply dope and which is both satisfactory for application by spraying and dries to a tough film, which provides both the lubrication properties and air admission properties required from a band ply dope.

There are various considerations to be taken into account in selecting the liquid medium, which acts as the continuous phase of the dope. It must first of all have sufficiently high volatility at room temperature to permit the dope film to dry within the normal time interval between the application of the dope and introduction into the press, say 30 minutes. The liquid medium must therefore exert a substantial vapor pressure at room temperature and thus should boil at a temperature not in excess of about 85°–90°C. and preferably somewhat below that level. The liquid medium must not present any health or excessive fire hazard and must not have any detrimental effect on the green tire through attack of the rubber.

As previously stated, the dope composition is required to be sprayable, which implies that the dispersed liquid and solid materials do not separate out at the nozzle under spraying conditions. It can be seen from the previous discussion of the difficulties which arise with the known compositions that it is very desirable that a sprayed film of the dope composition should not run and form pools on the surface of the band ply.

SUMMARY OF THE INVENTION

According to the broadest aspect of the invention a band ply dope is formulated as a thixotropic composition which can be maintained as a viscous sprayable material by moderate agitation and which quickly sets to a gel when agitation is terminated, such composition comprising a volatile liquid phase having a boiling point below 90°C., thickened by means of a thickening agent capable of imparting thixotropic properties to the liquid phase, said liquid phase having dispersed therein a fine solid material and a high viscosity lubricant, a film of said dope composition drying to a strong tough film of thickening agent containing dispersed lubricant particles and solid particles. The film of thickening agent is preferably of a porous nature since this provides improved separation of the cured tire from the bladder at the end of the press cycle. The thickening agent forms a relatively low proportion of the liquid composition. As the film dries, surface effects pull the liquid towards the solid particles and thus form pores in the eventual dried film.

It is well known that some degree of thixotropic properties can be imparted to aqueous media by water-soluble cellulose derivatives, which impart a high degree of thickening as a result of quite small additions, but these materials are insoluble in volatile organic solvents and only act as thickeners when activated by water. It is, however, undesirable to employ water as a component of a band ply dope, because of the slow evaporation rate at room temperature. Residual water in any substantial quantity in the film of band ply dope could lead to defects during the curing operation.

Some cellulose derivatives are however capable of providing thickening properties when dissolved in lower alcohol/water mixtures at room temperature. It has now been discovered that by using suitable grades of cellulose ethers containing lower alkyl substitutions at one or more of the three hydroxyl groups on the cellulose radical a band ply dope composition exhibiting highly desirable thixotropic properties can be based on a liquid solvent phase comprising a mixture of isopropyl alcohol and water in the proportions of an azeotropic mixture. Isopropyl alcohol and water form an azeotrope containing about 12% water and boiling at 80.4°C. Provided that the liquid phase contains sufficient or lesser amount of water than is required for an azeotropic mixture, no substantial quantity of water will remain in the dope film after being allowed to dry at room temperature under the normal conditions existing in a vehicle tire factory, allowing a typical time interval of at least 30 minutes from the application of the band ply dope to the green tire and the insertion of the green tire into the molding press. It will be realized that an azeotropic isopropyl alcohol/water mixture may be regarded as a single substance and that it satisfies the requirement of low fire hazard and absence of health risk under conditions of normal ventilation and has no detrimental effect on the rubber inner liner or band ply.

It has been found that cellulose ether derivatives with lower alkyl substitutions to form the ether groups have the necessary solubility characteristics to operate effectively in the band ply dopes of this invention. The di and mono substituted cellulose derivatives have been found satisfactory. Specifically, a di substituted cellulose ether derivative in which the substitution groups are a methyl group and a hydroxybutyl group has been found to function in this invention. Cellulose ethers of this type should have a degree of substitution of 0.8 to 1.9, a methoxyl molar substitution of 0.99 to 1.9 and a hydroxybutoxyl molar substitution of 0.04 to 0.75. Cellulose ethers of this type have been marketed by Dow under the trade name "Methocel HB".

A mono substituted cellulose ether, hydroxypropyl cellulose, has also been found to function satisfactorily in this invention. Cellulose ethers of this type should have a degree of substitution of 2 to 3 and a minimum hydroxypropoxyl molar substitution of 3. Hercules, Inc. has marketed a cellulose ether meeting this definition under the trade mark "Klucel G".

The amount of the cellulose ether thickening agent utilized is dependent upon the ether's molecular weight. The molecular weight must be such to produce the required viscosity and thixotropic properties in the band ply dope. It is believed that the minimum molecular weight for the thickening agent is in the order of 250,000. It is understood that different degrees of substitution and different substitution groups on the cellulose will affect the viscosity of the resulting solutions.

It has been found that derivatives of cellulose obtained by introduction of methoxy and hydroxybutoxy groups (as in Methocel HB) are soluble in aqueous isopropyl alcohol containing 20% or more water at room temperature to form a gelled thixotropic mass and that this mass can be let down to about 12% water by the addition of isopropyl alcohol without loss of the thixotropic gel properties of the medium. By correct proportioning of the thickener the medium may form a gel when under conditions of zero shear, yet be maintained fluid when subjected to moderate shear conditions; for example, circulation by a circulating pump will maintan conditions of sufficient fluidity to permit the material to be sprayed. By reason of its thixotropic properties a sprayed film gels almost immediately after contact with the band ply of the tire, particularly since a substantial proportion of isopropyl alcohol/water azeotrope flashes off during the transit of the droplets from the nozzle to the surface of the tire. The gel-forming tendency of a solution in an isopropyl alcohol-water azeotrope of a methyl cellulose derivative, which is soluble in a mixture of alcohol and water, is to some extent dependent upon the substituents of the cellulose derivative. In general it may be said that this solution should contain about 1½–4 parts of cellulose derivative per 100 parts of isopropyl alcohol-water azeotrope.

This thixotropic liquid medium acts as an excellent carrier for finely divided mica or other finely divided particulate material incorporated in the dope for air release purposes. The particulate material can be dispersed in it relatively easily by means of commercially available mixing equipment and there is very little tendency for fine particulate material to settle out even on prolonged standing.

The lubricant incorporated in a dope composition made in accordance with the present invention is preferably soluble in the isopropyl alcohol/water azeotrope. High viscosity silicone-polyglycol copolymers are satisfactory for this purpose and such copolymers, soluble in isopropyl alcohol/water azeotrope, are available at viscosities up to 32,000 centipoises at 20° C.

Although lower alcohols have well known aqueous emulsion-breaking properties it is found possible to incorporate an aqueous emulsion of a silicone oil into the liquid medium at the point where the gel is formed by the addition of cellulosic thickener to aqueous alcohol (before the addition of additional alcohol to reduce the water concentration to that of the azeotropic mixture).

For the purpose of appearance it is preferred that the dope film should have a dark or black appearance after the curing operation. However the dope film would ordinarily have a pale appearance where the particulate material is mica. In such case it is preferred to incorporate a small amount of carbon black as a pigment.

The proportions of lubricant and solid particulate material in the dope are not critical, although it is found that for any particular lubricant there is an optimum proportion of lubricant to employ to obtain optimum slip characteristics for the dope film. The amount of particulate material may be varied between about 10 and 40 parts per 100 parts of vehicle (solution of thickener in isopropyl alcohol/water azeotrope), while the amount of lubricant may vary about 1 and 15 parts per 100 parts of vehicle.

The preferred relative proportions of lubricant to mica (or other particulate material, such as graphite) are dependent upon the viscosity of the lubricant, ranging from about 1 part lubricant per 5 parts mica for a lubricant having a viscosity of 4,000 c.p.s. at 25°C. to about 1 part lubricant to 10 parts mica for a lubricant having a viscosity of 60,000 c.p.s. at 25° C. Where a lubricant of a viscosity as low as 2,000 c.p.s. is employed the ratio may be as low as about 1 part lubricant to 2 to 3 parts mica.

It has been found that the viscosity of the lubricant determines the amount required to achieve optimum slip of the dope film. As the viscosity rises the amount required decreases, but the relationship is not simple. Silicone copolymers of the same chemical composition but differing in viscosity will, when used at their optimum quantity, produce dope films of approximately equal slip. (This holds good provided the viscosity of the copolymers are higher than 2,000 c.p.s. at 20°C.). Copolymers with different chemical compositions will usually, when used at their optimum quantity, produce dope films with differing slip properties.

DETAILED DESCRIPTION OF THE INVENTION

The following examples set out in specific detail the specific compositions that have been successfully utilized in the invention giving specific ingredients and ratios and specific mixing procedures.

EXAMPLE I

One band ply dope in accordance with the present invention had the following composition:

| | |
|---|---|
| Isopropyl alcohol | 62.0 parts |
| Thickening agent | 1.6 parts |
| Water | 8.8 parts |
| Silicone-polyglycol copolymer (Viscosity 4000 centipoises at 25° C.) | 6.7 parts |
| Carbon black | 0.7 part |
| Wetting agent | 0.2 part |
| Mica | 20.0 parts |
| | 100.0 parts |

All parts are by weight.

The thickening agent in the above example is a hydroxybutylmethylcellulose sold by Dow Chemical Company under the name METHOCEL H B.

The silicone-polyglycol ester was sold by Dow Corning/Midland Silicones Ltd. under the name 82–011.

The purpose of the wetting agent is to promote the dispersal of the thickening agent in the isopropyl alcohol/water mixture and a number of different wetting agents will serve this function. One suitable wetting agent was obtained from Union Carbide Ltd. under the name Tergitol 15-S-3. Tergitol 15-S-3 is a mixture of linear C11 to C15 chain length alcohols substituted with three moles of ethylene oxide. The wetting agent dosage will depend on the type and amount of thickening agent used and the type of wetting agent used. Its range under practical conditions is .02 to 2.0 parts per 100 parts of the total liquid phase.

The wetting agent may be eliminated from the band ply dope composition of this invention by the use of sophisticated mixing equipment and processes; therefore, the presence of the wetting agent is not essential to the band ply dope of this invention. The Applicants recognize it is commercially more feasible to include the wetting agent but its inclusion is not essential to this invention. The Applicants have included the wetting agent in this example and in all subsequent examples.

In mixing the dope composition it is found most convenient to form a slurry of the thickening agent in one part of the isopropyl alcohol containing part of the wetting agent. To this slurry is added a mixture of the water and isopropyl alcohol, containing the remainder of the wetting agent. At this stage the alcohol/water ratio is about 3:1. The remainder of the alcohol containing carbon black is then added to bring the isopropyl alcohol/water ratio to that of the azeotrope. To this thixotropic liquid base is added the silicone-polyglycol copolymer or other lubricant soluble in the isopropyl alcohol/water azeotrope and finally the mica is stirred in to complete the composition.

When the lubricant is added in the form of an aqueous emulsion, it is added to the mixer at the same time as the first addition of water and isopropyl alcohol, its content of water being taken into account in arriving at the isopropyl alcohol/water balance of the final product.

It has been found that silicone oils provide superior slip properties to silicone-polyglycol copolymers, the incorporation of silicone oil/water emulsions into the dope is more difficult. It is therefore preferred to employ both silicone oil and copolymer to provide the necessary lubricant function, these components being incorporated into the mix in the manner explained above.

EXAMPLE II

A second form of band ply dope in accordance with the invention had the following composition:

| | |
|---|---|
| Isopropyl alcohol | 63.5 parts by weight |
| Thickening agent | 1.7 parts by weight |
| Water | 7.3 parts by weight |
| Silicone oil/water emulsion (Silicone oil 0.95) (Water 1.75) | 2.7 parts by weight |
| Silicone-polyglycol copolymer | 4.0 parts by weight |
| Carbon black | 0.6 part by weight |
| Wetting agent | 0.2 part by weight |
| Mica | 20.0 parts by weight |
| | 100.0 parts by weight |

The silicone oil/water emulsion contains 35% by weight silicone oil which has a viscosity of 60,000 c.p.s. at 25°C. and was sold by Union Carbide Ltd. under the name LE 463.

The silicone-polyglycol copolymer and thickening agent were the same as were used in Example I.

EXAMPLE III

|  | Parts |  |
|---|---|---|
| Isopropyl Alcohol | 66.2 | |
| Thickening agent (Methocel HB) | 1.7 | |
| Water | 5.5 | |
| 35% Emulsion of a silicone oil in water. (Viscosity of silicone oil 60,000 centipoises at 25° C.) | 5.7 | (3.7 water (2.0 silicon oil) |
| Carbon black | 0.7 | |
| Wetting agent | 0.2 | |
| Mica | 20.0 | |
|  | 100.0 | |

All parts are by weight.

Again the thickening agent is the same as used in the Examples I and II. The sole lubricant is a silicone oil in a water emulsion.

EXAMPLE IV

|  | Parts |
|---|---|
| Isopropyl Alcohol | 61.0 |
| Thickening agent (Klucel G) | 3.8 |
| Water | 8.3 |
| Silicone-polyglycol (copolymer (Viscosity 4,000 centipoises at 25°C.) | 6.7 |
| Wetting agent | 0.2 |
| Mica | 20.0 |
|  | 100.0 |

All parts are by weight.

The thickening agent is the propyl derivative, Klucel G.

It is found that a dope composition produced in accordance with these Examples is sprayable without separation of the mica content and produces a hard film having excellent lubricant and air separation properties and which will stand the severe rubbing to which a band ply dope is subject in the molding of a radial-cord tire in the type of presses referred to above.

We claim:

1. A band ply dope in the form of a thixotropic composition, maintainable as a viscous sprayable material by moderate agitation which rapidly sets to a gel when agitation is terminated, such composition comprising an azeotropic mixture of isopropyl alcohol and water as the volatile liquid phase, such mixture having sufficient water to yield a boiling point below 90°C., a hydroxybutyl methyl cellulose thickening agent capable of imparting thixotropic properties to said liquid, a filler selected from the group consisting of finely divided mica and finely divided graphite, a high viscosity lubricant having a viscosity in excess of 2,000 centipoises at 20°C. and selected from the group consisting of a silicone oil and a silicone - polyglycol copolymer, said dope having 1.5 to 4 parts of said thickening agent, 10 to 40 parts of said finely divided filler, and 1 to 15 parts of said lubricant, all per 100 parts of said liquid phase, said dope composition being capable of drying to a strong, tough film containing said dispersed lubricant and filler.

2. A band ply dope in the form of a thixotropic composition, maintainable as a viscous sprayable material by moderate agitation which rapidly sets to a gel when agitation is terminated, such composition comprising an azeotropic mixture of isopropyl alcohol and water as the volatile liquid phase, such mixture having sufficient water to yield a boiling point below 90°C., a hydroxypropyl cellulose thickening agent capable of imparting thixotropic properties to said liquid, a filler selected from the group consisting of finely divided mica and finely divided graphite, a high viscosity lubricant having a viscosity in excess of 2,000 centipoises at 20°C. and selected from the group consisting of a silicone oil and a silicone - polyglycol copolymer, said dope having 1.5 to 4 parts of said thickening agent, 10 to 40 parts of said finely divided filler, and 1 to 15 parts of said lubricant, all per 100 parts of said liquid phase, said dope composition being capable of drying to a strong, tough film containing said dispersed lubricant and filler.

* * * * *